F. V. UBEZZI.
VEHICLE WHEEL TIRE.
APPLICATION FILED MAR. 10, 1915.
1,165,145.
Patented Dec. 21, 1915.
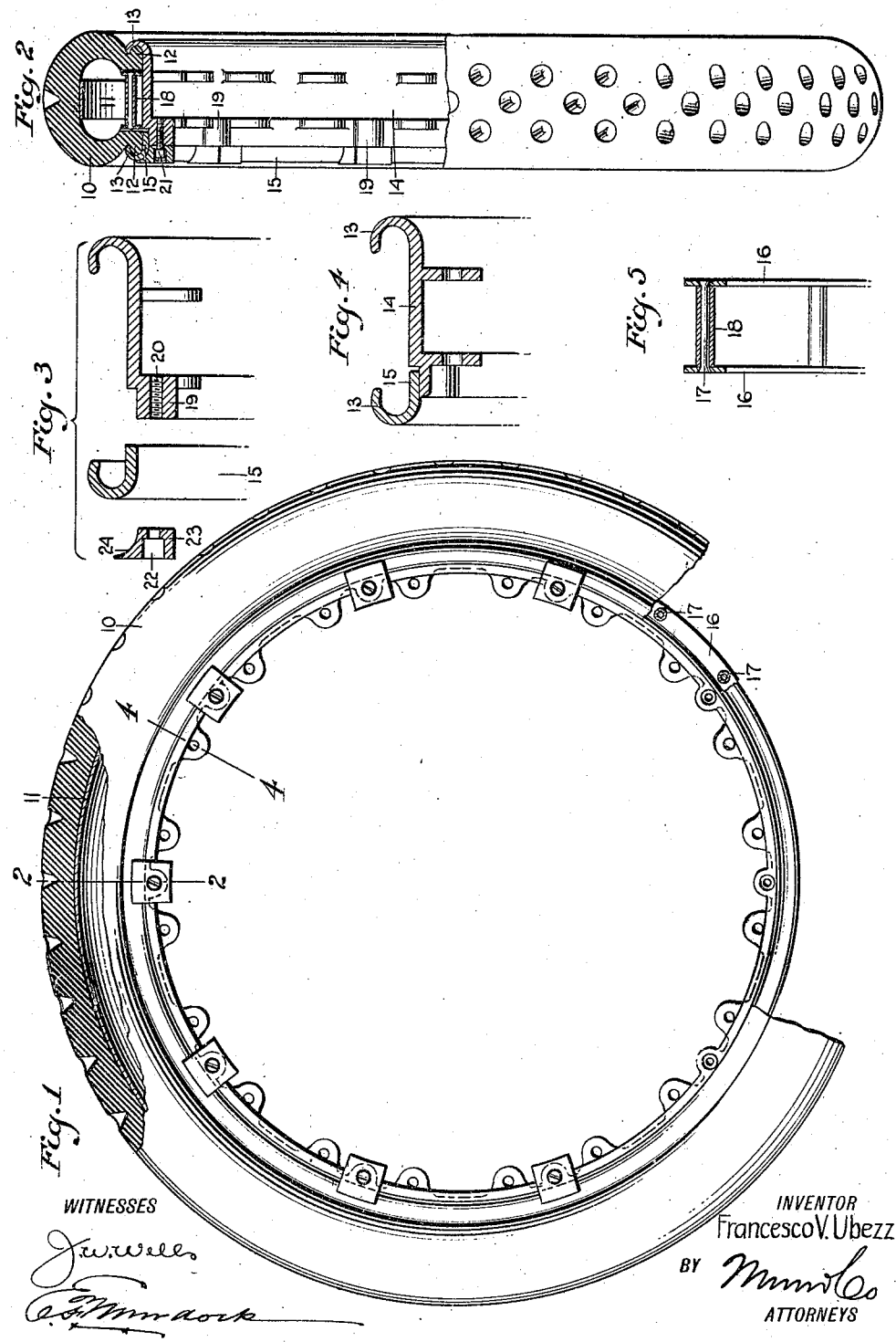
WITNESSES
INVENTOR
Francesco V. Ubezzi
BY
ATTORNEYS

UNITED STATES PATENT OFFICE.

FRANCESCO V. UBEZZI, OF NEW YORK, N. Y., ASSIGNOR TO TRANSCONTINENTAL WHEEL CO., OF NEW YORK, N. Y., A CORPORATION OF NEW YORK.

VEHICLE WHEEL-TIRE.

1,165,145.  Specification of Letters Patent.  Patented Dec. 21, 1915.

Application filed March 10, 1915. Serial No. 13,357.

*To all whom it may concern:*

Be it known that I, FRANCESCO V. UBEZZI, a subject of the King of Italy, and a resident of the city of New York, borough of Manhattan, in the county and State of New York, have invented a new and Improved Vehicle Wheel-Tire, of which the following is a full, clear, and exact description.

Among the principal objects which the present invention has in view are: to provide a collapsible wearing shoe having adhesive properties with means for expanding said shoe to, and for maintaining the same in service form; to provide a collapsible tire and spreader therefor adapted for employment in connection with a demountable tire rim; and to provide a tire relatively immune from such accidents as impair the service condition thereof.

*Drawings.*—Figure 1 is a side view of a tire constructed and arranged in accordance with the present invention and a supporting rim therefor, part of said tire being sectioned to show the internal arrangement of the parts thereof, and a portion of said tire being omitted to disclose the interior members forming part of the construction; Fig. 2 is an edge view of the tire and rim, the same being partly cut away to show a cross section of the construction, the section being taken as on the line 2—2 in Fig. 1 and showing a portion of the inner surface of the rim at the far side thereof; Fig. 3 is a detail view on an enlarged scale and in cross section, showing a felly rim, demountable ring and fastening nut therefor, preferably employed in conjunction with tires of the present construction, the parts being shown in dissociated relation; Fig. 4 is a cross section on an enlarged scale of the tire rim and demountable ring, the section being taken as on the line 4—4 in Fig. 1; Fig. 5 is a detail view showing the edge and cross section of the spreading ring used in conjunction with, to prevent collapsing of the edges of, a tire when constructed and arranged in accordance with the present invention.

*Description.*—As seen in the accompanying drawings, a tire, when constructed and arranged in accordance with the present invention, does not employ an inflatable inner tube to maintain the service formation and condition of the shoe 10. The shoe 10 is maintained in its expanded condition by a flat expansion ring 11. The ring 11 is preferably constructed from highly tempered steel having a flexibility varied to suit the exigencies of any particular work for the execution of which it is called upon. The shoe 10 is U-shaped in cross section, opening toward the center of the curve to which it is constructed. It is provided with lips 12 adapted to extend below the overhanging edges 13 of a rim 14 and of a demountable ring 15. The edges of said shoe are prevented from collapsing or contracting by a filler ring, such as shown in Fig. 5 of the drawings, which embodies two edgewise-disposed metal supporting rings 16, and spacing spools 18 which infold the bolts 17 and bear against the inner sides of the rings 16.

Tires constructed and arranged as shown in the accompanying drawings and as above described are preferably mounted on wheels having felly rims such as indicated by the numeral 14, whereon a series of anchor blocks 19 are formed. The blocks 19, as shown best in Fig. 3 of the drawings, have each a screw-threaded bore 20, which the threads of fastening screws 21 engage. The screws 21 are provided with enlarged and preferably flat heads to seat in a recess 22 with which each of a series of clamp nuts 23 is provided, as best shown in Fig. 3 of the drawings. Each of the clamp nuts 23 has a concave curved extension 24 adapted to bear against the side of the ring 15 to force the same upon the lip 12 of the tire, to hold the same in service position by the grip of the overhanging edges 13 of the rim 14 and ring 15.

Claim:

A tire as characterized comprising a collapsible wearing shoe U-shaped in cross section; the edges whereof are spaced apart for forming an annular channel opening toward the center of said tire; metallic means mounted within said shoe, in the plane of the tread thereof, for maintaining the extension of said shoe; clamping means engaging the edges of said shoe, for holding the same in service relation; rigid means disposed between the inner surfaces of said edges, for maintaining the spaced relation thereof, said means embodying an open-centered skeleton ring member having thin, full ring sides; and a plurality of rivet bolts and
5 spacing members surrounding the same for preventing the collapsing of said ring sides.

In testimony whereof I have signed my name to this specification in the presence of two subscribing witnesses.

FRANCESCO V. UBEZZI.

Witnesses:
EUGENE J. ORSENIGO,
HENRY ORSENIGO.